(12) United States Patent
Olmstead et al.

(10) Patent No.: US 12,271,867 B1
(45) Date of Patent: Apr. 8, 2025

(54) PREDICTING RESOURCE LIFECYCLES AND MANAGING RESOURCES IN ENTERPRISE NETWORKS

(71) Applicant: State Farm Mutual Automobile Insurance Company, Bloomington, IL (US)

(72) Inventors: Rebecca Anne Olmstead, Bloomington, IL (US); Amy Marie Stuepfert, Le Roy, IL (US); Julie Christine Wirtjes, Bloomington, IL (US); Cheryl L. Legan, Normal, IL (US); Bruce Lininger, Normal, IL (US); Gurnek Singh Mokha, Urbana, IL (US); Mathew Farley, Champaign, IL (US); Patrick Kan, Cupertino, CA (US); Sudesh Sahu, Normal, IL (US); Socrates Krishnamurthy, Aurora, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 145 days.

(21) Appl. No.: 17/171,666

(22) Filed: Feb. 9, 2021

Related U.S. Application Data

(60) Provisional application No. 62/972,561, filed on Feb. 10, 2020.

(51) Int. Cl.
*G06Q 10/20* (2023.01)
*G06Q 10/0631* (2023.01)
*G06Q 10/10* (2023.01)

(52) U.S. Cl.
CPC ....... *G06Q 10/20* (2013.01); *G06Q 10/06312* (2013.01); *G06Q 10/10* (2013.01)

(58) Field of Classification Search
CPC .. G06Q 10/20; G06Q 10/0635; G06Q 30/018; G06N 20/00
See application file for complete search history.

(56) References Cited

U.S. PATENT DOCUMENTS

| | | | |
|---|---|---|---|
| 8,555,238 | B2 | 10/2013 | White et al. |
| 9,471,452 | B2 | 10/2016 | McElhinney et al. |

(Continued)

FOREIGN PATENT DOCUMENTS

| | | | | |
|---|---|---|---|---|
| WO | WO2002001347 A2 | 1/2002 | | |
| WO | WO-2010081768 A1 * | 7/2010 | .......... | G06F 11/3006 |

OTHER PUBLICATIONS

"How to Visualize Maintenance Performance", (Oct. 2019) Learning Center, UpKeep, https://www.onupkeep.com/leanring/maintenance-metrics/visualize-maintenance-performance, 5 pages.

(Continued)

*Primary Examiner* — Johnna R Loftis
(74) *Attorney, Agent, or Firm* — Lee & Hayes, P.C.

(57) ABSTRACT

This disclosure describes systems, devices, and techniques for managing resources in an enterprise network using lifecycle prediction. In an example method, a resource may be identified as operational within an enterprise network. An initial lifecycle of the resource may be estimated based at least partly on one or more characteristics of the resource. At least one trigger condition associated with the resource may be identified as having occurred. In response to identifying that the at least one trigger condition has occurred, an updated lifecycle of the resource may be estimated by applying at least one rule associated with the at least one trigger condition to the initial lifecycle. An expiration time of the resource may be determined based on the updated lifecycle. The resource may be replaced in advance of the expiration date of the resource.

20 Claims, 11 Drawing Sheets

(56) References Cited

U.S. PATENT DOCUMENTS

| | | | |
|---|---|---|---|
| 10,142,204 B2 | 11/2018 | Nickolov et al. | |
| 11,099,743 B2* | 8/2021 | Borlick | G06N 3/084 |
| 11,677,623 B2* | 6/2023 | Celichowski | H04L 41/14 |
| | | | 709/221 |
| 2016/0063417 A1 | 3/2016 | Mandalia et al. | |
| 2018/0295010 A1* | 10/2018 | Grobe | H04L 41/0816 |
| 2019/0379577 A1* | 12/2019 | Tiwari | H04L 41/0654 |
| 2020/0004435 A1* | 1/2020 | Borlick | G06F 3/0653 |
| 2020/0099592 A1* | 3/2020 | Mahindru | H04L 41/5019 |
| 2020/0314458 A1* | 10/2020 | Pinel | G11B 27/031 |
| 2020/0364638 A1* | 11/2020 | Molloy | G06Q 10/0637 |

OTHER PUBLICATIONS

Jiang, G., et al, "Ranking the Importance of Alerts for Problem Determination in Large Computer Systems", Proceedings of the 6th International Conference on Automatic Computing—ICAC '09. doi: 10.1145/1555228.1555232; (Jun. 2009); pp. 1-12.

* cited by examiner ically replacing resources based on predicted lifecycles of the resources.

PREDICTING RESOURCE LIFECYCLES AND MANAGING RESOURCES IN ENTERPRISE NETWORKS

RELATED APPLICATIONS

This patent application claims priority to U.S. Provisional Patent Application No. 62/972,561, filed Feb. 10, 2020, and entitled "Predicting Resource Lifecycles and Managing Resources in Enterprise Networks," the entirety of which is hereby incorporated by reference.

BACKGROUND

Various enterprises, such as businesses, hospitals, schools, or the like, may utilize numerous hardware and/or software resources to perform everyday tasks. However, in some cases, these resources may need to be updated or otherwise upgraded over time. When an enterprise possesses numerous (e.g., thousands) of resources that may be replaced over time, several problems arise.

First, the enterprise may not be able to track which resources are in need of replacement. Consequently, the enterprise may continue to utilize resources that are in need of replacement. These outdated resources may be less effective than alternatives, which may cause functional problems within the enterprise. Further, the outdated resources may pose ongoing security risks to the enterprise.

Second, the enterprise may be surprised with the associated costs (e.g., time, expense, etc.) with replacing a large number of resources. Even if the enterprise was aware of which resources are in need of replacement, the enterprise may have to replace a large number of resources at one time. The costs of such large-scale replacement may prevent the enterprise from efficiently replacing the resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes systems, devices, and techniques for managing resources by predicting their lifecycles according to various factors. These resources may be interconnected in enterprise networks. By accurately predicting the lifecycles of resources in enterprise networks, the corresponding enterprises may be able to effectively plan updates to the enterprise network in advance.

An example enterprise network can include hundreds, thousands, or even more resources that may have limited lifetimes. These resources may include hardware, software, or the like. The lifetime of a given resource may expire when the resource is no longer effective, may introduce unacceptable security risks into the enterprise network, or the like.

Enterprises may seek to replace resources at the ends of their lifecycles. However, enterprises face various challenges for effectively and efficiently replacing resources. In some cases, an enterprise associated with a relatively large number of resources (e.g., hundreds, thousands, or an even greater number of resources) may lack a way to effectively track the individual lifecycles of the resources over time.

In some examples, an enterprise may be unable to plan to replace resources in an associated network. Accordingly, the enterprise may be surprised with sudden costs (e.g., expenses, downtime, etc.) associated with replacing obsolete resources.

Various implementations of the present disclosure can be used to assist enterprises with tracking resource lifecycles and/or with planning ahead for replacement of resources that are reaching the ends of their lifetimes. In various examples, prediction models can be trained to evaluate factors (e.g., triggers or trigger events) that are relevant to lifecycle prediction, based on training data sets gathered from the enterprise network, vendor-based sources, as well as other networks (e.g., within the same industry as the enterprise network). As resources join the enterprise network, the prediction models can be used to predict lifecycles (e.g., lifetimes, lifespans, life stages, etc.) of the resources. Further, as the resources experience various events (e.g., trigger events) during their lifetimes, the predicted lifecycles can be updated by the prediction models.

Various implementations also relate to systems that take action based on the predicted lifecycles of various resources within a network. Some example systems may automatically produce reports by which users (e.g., IT administrators) can use to plan for replacement of the resources in the network. In some implementations, systems can automatically facilitate replacement of resources that are obsolete or are nearing obsolescence.

Figure 1:
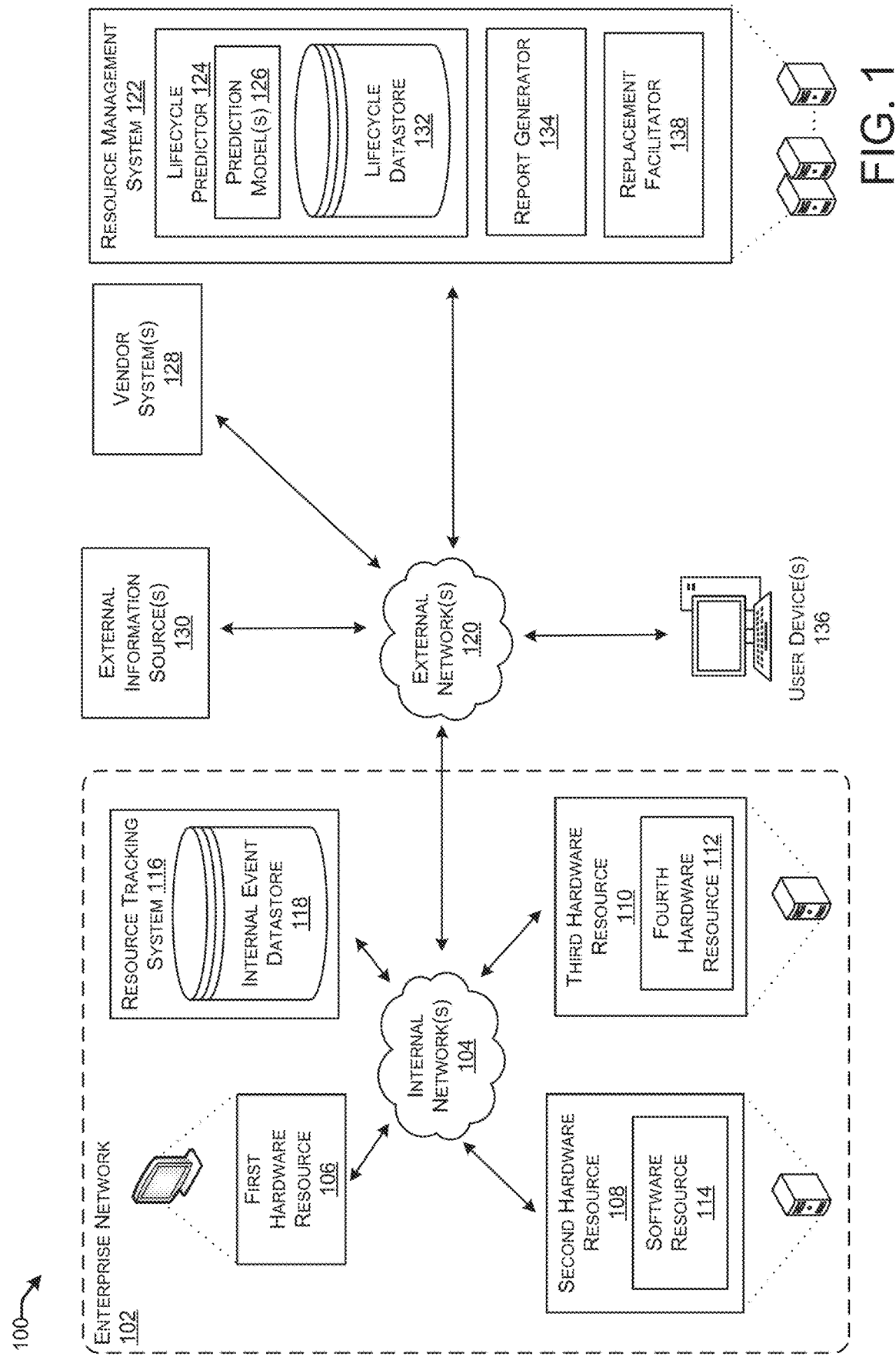
FIG. 1 illustrates an example environment for managing resources using lifecycle prediction.

FIG. 1 illustrates an example environment 100 for managing resources using lifecycle prediction. As illustrated, the environment 100 may include an enterprise network 102. The enterprise network 102 may include one or more interconnected clusters of resources that are associated with an enterprise. As used herein, the term "enterprise," and its equivalents, can refer to any organization that utilizes, manages, and/or possesses multiple resources. In some cases, the enterprise network 102 may be distributed over one or more geographic locations. For instance, the enterprise network 102 can include multiple offices associated with the enterprise that are located in different geographic locations (e.g., different buildings, neighborhoods, cities, states, countries, or the like).

The enterprise network 102 may include various resources interconnected by at least one internal network 104. As used herein, the terms "resource," "asset," and their equivalents, can refer to any device, software, system, or the like, that may be replaced after being in use for a period of time. The internal network(s) 104 may include a wired and/or wireless communication network by which data can be transmitted between various nodes (e.g., resources and/or other devices within the enterprise network 102).

The resources in the enterprise network 102 can include various hardware resources, such as a first hardware resource 106, a second hardware resource 108, a third hardware resource 110, and a fourth hardware resource 112. As used herein, the terms "hardware," "hardware resource," "hardware asset," and their equivalents can refer to one or more physical devices, such as physical parts of a computer. Examples of hardware resources can include printers, projectors, scanners, copiers, fax machines, telephones, speakers, headsets, microphones, cameras, mobile devices (e.g., laptops, mobile phones, tablet computers, etc.), Internet of Things (IoT) devices, light fixtures, light bulbs, computers, Central Processing Units (CPUs), Graphics Processing Units (GPUs), keyboards, computer memory (e.g., Random Access Memory (RAM), Read Only Memory (ROM), storage devices, etc.), sound cards, motherboards, or the like. In some cases, one hardware resource may include another hardware resource. For example, a computer may include a CPU, wherein the computer may have a different lifecycle than the CPU.

The resources in the enterprise network 102 may further include various software resources, such as software resource 114. As used herein, the terms "software," "software resource," "software asset," and their equivalents, may refer to instructions that instruct one or more device(s) (e.g., a computer, one or more processors within a computer, or the like) to perform various functionality. In some cases, software can be stored on a device, such as a memory device. Examples of software resources can include programs, operating systems, firmware, drivers, Virtual Machines (VMs), or the like. A software resource may be installed or otherwise executed by a hardware resource. For example, as illustrated in FIG. 1, the software resource 114 may be executed by the second hardware resource 108.

The enterprise network 102 may further include a resource tracking system 116. The resource tracking system 116 may include at least one hardware or hardware component configured to track or monitor events associated with the resources in the enterprise network 102. In various implementations, each one of the resources may experience events and report the events to the resource tracking system 116. As used herein, the term "event," and its equivalents, can refer to any experience by a resource, which may be relevant to the lifecycle of that resource. Examples of events may include connecting to the enterprise network 102, accesses by users or computing devices, duration of uses, latency associated with uses or aspects of uses, CPU usage associated with uses or aspects of uses, software crashes, performance events, or the like. At least some of these events may be relevant to lifecycle prediction. In some cases, the resource tracking system 116 may store entries associated with the resources and the events relevant to lifecycle prediction in an internal event datastore 118.

In various implementations, the enterprise network 102 may be connected to at least one external network 120 that is maintained outside of the enterprise network 102. For example, the external network(s) 120 may be connected to the internal network(s) 104 of the enterprise network 102. In some implementations, the enterprise network 102 may be associated with a security policy that protects the enterprise network 102 from malicious data traffic transmitted from the external network(s) 120. Although not illustrated, in some instances, the enterprise network 102 may include a firewall that inspects data traffic transmitted between the internal network(s) 104 and the external network(s) 120.

The environment 100 may include a resource management system 122 that may be configured to predict the lifecycles of the various resources in the enterprise network 102. In some cases, the resource management system 122 may further manage the resources in the enterprise network 102 based on the predicted lifecycles. Although illustrated as being separate from the enterprise network 102 in FIG. 1, in some implementations, the resource management system 122 may be incorporated into the enterprise network 102 itself. For example, the resource management system 122 may be connected directly to the internal network(s) 104 of the enterprise network 102, e.g., to receive information directly from the resources and/or the resource tracking system 116.

The resource management system 122 is illustrated as including a lifecycle predictor 124. The lifecycle predictor 124 may be comprised of hardware and/or software. The lifecycle predictor 124 may be configured to predict and/or update lifecycles of any of the resources in the enterprise network 102. Although not illustrated, in some implementations, the lifecycle predictor 124 may be configured to estimate the lifecycles of resources outside of the enterprise network 102 (e.g., in other enterprise networks).

As used herein, the term "lifecycle," and its equivalents, can refer to at least one of a lifetime, a lifespan, or one or more life stages of a resource. A resource may have a finite lifetime based on relevant factors. The lifetime of the resource may begin when the resource is available for purchase, purchased, initialized, registered, connected to a corresponding enterprise network, or the like. The lifetime of a resource may expire when the resource becomes nonfunctional, broken, unsupported by the corresponding enterprise, unsupported by the corresponding vendor, or the like. In some cases, the lifetime of a resource may expire when an expense of utilizing the resource outweighs the benefit of the resource to the corresponding enterprise. In some implementations, the lifetime of a resource may expire when it is less costly to replace the resource than to continue utilizing the resource in the corresponding enterprise network. Other parameters and/or criteria may also or alternatively be used to define a resource's lifecycle.

In some implementations, a lifecycle of a resource may correspond to one or more life stages. A life stage may be correlated with a corresponding course of action and/or adjustment in predicted lifetime of the resource. For example, a lifespan of a given resource may include at least one of an "emerging" life stage, a "steady state" life stage, a "declining" life stage, a "sunsetting" life stage, or an "obsolete" life stage. In some implementations, a resource in an "emerging" life stage (also referred to as an "investment" life stage) may be available for integration into an enterprise network, but may be relatively risky for large-scale adoption in the enterprise network (e.g., due to the potential for security and/or crash risks due to being an early-stage product offering by the corresponding vendor). A resource in a "steady state" life stage may be fully supported by a vendor of the resource and may be unlikely to introduce security risks into the enterprise network. A resource in a "declining" life stage may be nearing the end of its lifetime. A resource in the "sunsetting" life stage may be advantageously replaced. A resource in the "obsolete" life stage may be at the end of its lifetime. Example life stages of resources are described in further detail, below, with reference to FIG. 2.

The lifecycle predictor 124 may include one or more prediction models 126 (also referred to as "predictive models") by which the lifecycle predictor 124 can estimate lifecycles of the resources in the enterprise network 102. In some implementations, the prediction model(s) 126 may include at least one machine learning model. Examples of machine learning models include at least one of a k-nearest neighbors model, a reinforcement learning model, a bootstrap aggregation model, a stochastic gradient descent model, a genetic algorithm, a radial basis function network, a backpropagation model, a minimum redundancy feature selection model, a random cut forest model, a latent direchlet allocation model, a principal component analysis model, a gradient boosting model, or the like.

The machine learning model(s) in the prediction model(s) 126 may include any combination of hardware, software, and/or data that can be automatically trained to identify patterns in a training data set. In some implementations, a training data set may include previously observed lifecycles of resources in the enterprise network 102 and/or resources outside of the enterprise network 102. The training data set may further indicate various events and/or features associated with the resources whose lifecycles are included in the training set. In some cases, the training data set may include events and/or features associated with vendors of the resources whose lifecycles are included in the training data set.

The training data set may be obtained from various sources. In some implementations, the resource tracking system 116 can transmit at least a portion of the training data set to the lifecycle predictor 124 in the resource management system 122. For instance, the resource tracking system 116 can transmit, to the resource management system 122, records of various events associated with resources in the enterprise network 102 that are stored in the internal event datastore 118. Accordingly, the prediction model(s) 126 may be trained according to trends associated with resources that are previously and/or currently utilized by the enterprise network 102.

In various cases, at least a portion of the training data set may be provided by one or more vendor systems 128. The vendor system(s) 128 may include hardware and/or software configured to provide information from the vendors of the various resources in the enterprise network 102. The vendor system(s) 128 may provide advertisements, e-mails, product offers, or the like, from the vendors. In some cases, the vendor system(s) 128 may provide notifications from the vendors about the types of resources in the enterprise network 102, such as bug fixes, warnings, usage statistics, or the like. The information provided by the vendor system(s) 128 may be incorporated into the training data set. Accordingly, the prediction model(s) 126 may be trained according to trends associated with the vendors of the resources in the enterprise network 102.

According to some implementations, at least a portion of the training data set may be provided by at least one external information source 130. The external information source(s) 130 may include various hardware and/or software configured to track and report various information associated with the resources that may be relevant to lifecycle prediction. In some cases, the external information source(s) 130 can include newsfeeds, websites, and other resources that report security vulnerabilities, product offerings, product reviews, rumors about new product developments by vendors of the resources, or the like. Thus, the prediction model(s) 126 may be trained based on a broad variety of different factors that could potentially impact lifecycle prediction.

The prediction model(s) 126 may be configured to identify factors that are relevant (e.g., correlated) to the lifecycles of the resources using the training data set. In some examples, the training dataset may include a large number of factors (e.g., events, vendor information, etc.) that may or may not be relevant to the lifecycles of the resources. The prediction model(s) 126 may be configured to determine which of the factors are correlated with the lifecycles of the resources. For example, the prediction model(s) 126 may identify that the occurrence of more than one crash event of a software resource in a month may indicate that the software resource is sunsetting. The prediction model(s) 126 may further identify that the occurrence of a different event associated with the software resource is not correlated with a lifecycle stage of the software resource. Any factors with more than a threshold significance with lifecycle prediction may be referred to as "trigger events" or "trigger conditions."

According to various implementations, the prediction model(s) 126 may generate one or more rules based on the trigger condition(s). These rules may include mathematical or logical equations that can be used to accurately predict a lifecycle of a resource based on the occurrence of the trigger condition(s). In some cases, the prediction model(s) 126 may similarly predict the lifecycles of similarly situated resources. In some examples, the prediction model(s) 126 may generate and/or include one or more rules that can be consistently applied to a class of similarly situated resources. A class may be defined as multiple resources sharing at least one of the same vendor, version, or technological type (e.g., operating system, computer, or the like). Accordingly, a trigger event (e.g., a crash event) for a first resource in a first class (e.g., all operating systems) may be used by the prediction model(s) 126 to calculate an initial or updated lifecycle for the first resource according to a rule associated with the first class (e.g., the rule may decrease the predicted lifetime of the first resource), however, the same trigger event for a second resource in a second class (e.g., a hardware projector) may not be used by the prediction model(s) 126 to calculate an initial or updated lifecycle for the second resource, due to the absence of a rule associated with the second class.

In various implementations, the prediction model(s) 126 may be configured to identify relationships between the relevant factors and the lifecycles of the resources using the training set. The prediction model(s) 126 may identify a significance (e.g., mathematical significance) between a given relevant factor and the lifecycles of the resources associated with the relevant factor. For example, the prediction model(s) 126 may determine that the resources supplied by a first vendor are 80% likely to be sunsetting during a particular month of the year, the resources supplied by a second vendor are 60% likely to have lifetimes of at least two years, or the like.

In some examples, the prediction model(s) 126 may be configured to identify how to update a previously estimated lifecycle of a given resource in response to identifying additional information associated with the given resource. The prediction model(s) 126 may use the training data set to identify correlations between lifecycles of various resources represented by the training data set and relevant events that occur during the lifetimes of the resources. For example, the prediction model(s) 126 may identify a 90% chance that a given resource will no longer be supported by the corresponding vendor of the resource within two years of the identification of a security vulnerability associated with the given resource.

Based at least partly on the relevant factors and/or the relationships between the relevant factors and the lifecycles of the resources using the training set, the prediction model(s) 126 may be trained to estimate the lifecycles of resources that are outside of the training set. In various implementations, the trained prediction model(s) 126 may predict the lifecycle of a given resource based on the relevant factors of that resource. According to some cases, the prediction model(s) 126 may update a previously estimated lifecycle of a given resource based on the occurrence of an event associated with the resource during the lifetime of the resource.

In various implementations, the resource management system 122 may transmit, to the resource tracking system 116, indications of one or more lifecycle-relevant factors (e.g., identified by the prediction model(s) 126). The resource tracking system 116 may selectively transmit indications that the resources in the enterprise network 102 have experienced or are otherwise associated with the life-cycle relevant factors. For example, the resource tracking system 116 can transmit, to the resource management system 122, data packets reporting a single event experienced by a single resource in the enterprise network 102, reporting multiple events experienced by multiple resources in the enterprise network 102, or the like. The data packets may be transmitted in response to the occurrence of the events, periodically (e.g., once a day, once a week, etc.), or the like. Accordingly, the resource management system 122 may predict and/or update estimated lifecycles of the resources in the enterprise network 102 based on data supplied by the resource tracking system 116.

The prediction model(s) 126 may include at least one machine learning model, such as an artificial neural network, a decision tree or other tree-based algorithm (e.g., XGBoost), a Support Vector Machine (SVM), a regression model, a Bayesian network (e.g., a Bayesian Ridge Regression Model), a Genetic Algorithm (GA), a generalized linear model algorithm (e.g., a generalized additive model), or the like. The machine learning model(s) may be supervised, unsupervised, or a combination thereof. In various implementations, the machine learning model(s) may include functionality that cannot practically be performed in the human mind or on pen and paper. For example, the machine learning model(s) may be configured to identify trends in at least 100, at least 1000, or at least some other number of previously observed resources. In various examples, the machine learning model(s) may be configured to identify features (e.g., events) relevant to lifecycle prediction among numerous (e.g., at least 10, at least 100, at least 1000, or some other number) of observations of previously deployed resources. Accordingly, the machine learning model(s) may be fundamentally rooted in computer technology.

The lifecycle predictor 124 may store the lifecycles of the resources estimated by the prediction model(s) 126 in a lifecycle datastore 132. The lifecycle datastore 132 may include at least one database, for instance. In some implementations, the lifecycle datastore 132 stores the predicted lifecycles in a hash table indexed by resource identifier. In some implementations, the lifecycle predictor 124 may initially estimate, using the prediction model(s) 126, a lifecycle of a resource in response to identifying that the resource has connected to the enterprise network 102. The lifecycle predictor 124 may store the initially predicted lifecycle of the resource in the lifecycle datastore 132. The lifecycle predictor 124 may subsequently receive an indication that the resource has experienced a lifecycle-relevant event. The lifestyle predictor 124 may retrieve the initially predicted lifecycle of the resource in the lifecycle datastore 132, modify the predicted lifecycle using the prediction model(s) 126 based on the lifecycle-relevant event, and store the updated lifecycle in the lifecycle datastore 132. Thus, the lifecycle predictor 124 may track the predicted lifecycles of the resources over time.

In various implementations, the lifecycle predictor 124 may take various actions based on the predicted lifecycle. For example, the lifecycle predictor 124 may take one or more actions associated with a resource in the enterprise network 102 in response to identifying that the lifetime of the resource is predicted to expire within a predetermined threshold amount of time (e.g., within one day, one month, one year, two years, or some other time period). In some instances, the lifecycle predictor 124 may take one or more actions associated with a resource in the enterprise network 102 in response to identifying that the resource is in a particular life stage (e.g., declining, sunsetting, or some other life stage).

An example of an action that the lifecycle predictor 124 may take based on the predicted lifecycles of resources in the enterprise network 102 includes generating a report that indicates the predicted lifecycles of the resources. The lifecycle predictor 124 may include a report generator 134 that can be configured to extract one or more predicted lifecycles stored in the lifecycle datastore 132. The report generator 134 may generate a report that indicates the predicted lifecycle(s) extracted from the lifecycle datastore 132 in an easy-to-understand format. The report generator 134 may transmit the report to one or more user devices 136 that may be configured to output the report. In some examples, the user device(s) 136 may be associated with an administrator of the enterprise network 102, such as an IT specialist of the enterprise network 102. Accordingly, the administrator can efficiently track and plan for replacements of a large number of resources in the enterprise network 102.

In various implementations, the lifecycle predictor 124 may automatically procure replacement resources based on the predicted lifecycles. The lifecycle predictor 124 may include a replacement facilitator 138 that may be configured to order or otherwise cause the enterprise network 102 to obtain replacements to resources whose lifetimes are expired or within a threshold time period (e.g., one day, one month, one year, or some other time period) of expiring. In some implementations, the replacement facilitator 138 can transmit, to the vendor system(s) 128, an appropriate replacement resource for a resource that has expired or is about to expire. The vendor system(s) 128 may subsequently provide the replacement resource to be integrated into the enterprise network 102. The expired (or about-to-be expired) resource may be removed from the enterprise network 102.

As noted above, some of the prediction model(s) 126 may determine rules and/or trigger events that are based at least in part on a type or classification of a resource. In at least some examples, a user, e.g., an administrator of the enterprise network 102, can determine or assign a classification to a resource. For instance, the administrator may assign or otherwise associate a class or type designation to a resource upon initiating or launching the resource. Such designations may be maintained in or otherwise accessible to the resource tracking system 116.

In at least some instances, however, the prediction model(s) 126 may further include functionality to classify new resources, e.g., as a class, type, category, or the like. For example, the prediction model(s) 126, or a portion thereof, may be trained to determine, or predict, a class with which the new resource is associated. Such prediction model(s) 126 may be trained on various factors, including but not limited to, a vendor of the resource, a use for the resource, a technical description, e.g., plain language description, of the resource, a model or version number associated with the resource, one or more tasks performed by the resource, functionality of the resource, e.g., as determined from code associated with the resource, details of other resources associated with the resource, or other information. In at least some instances, the prediction model(s) 126 can include a natural language processor, e.g., to consider words in the technical description, operator manual, or other resource-associated documentation.

Figure 2:
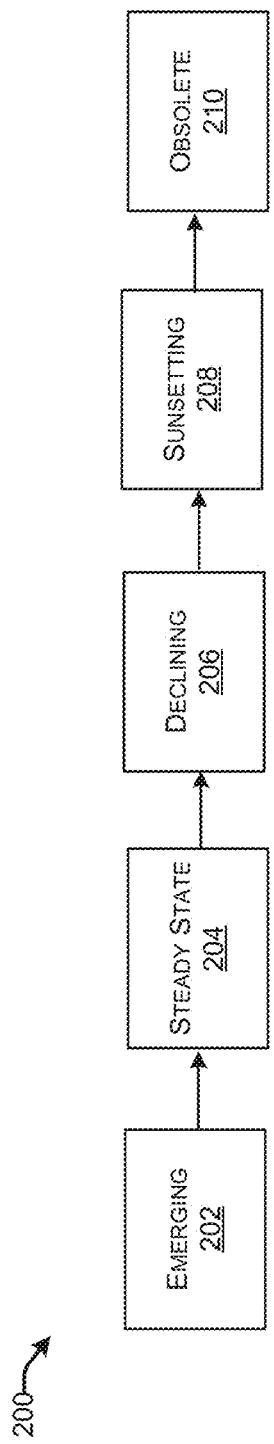
FIG. 2 illustrates an example lifecycle progression of a resource.

FIG. 2 illustrates an example lifecycle progression 200 of a resource. The resource may include any resource in an enterprise network (such as the enterprise network 102 described above with reference to FIG. 1), for instance.

The lifecycle of the resource may begin with an emerging 202 life stage. In some implementations, a resource in the emerging 202 life stage (also referred to as an "investment" life stage) may be available for integration into an enterprise network. In some cases, a resource in the emerging 202 life stage can be relatively risky for large-scale adoption in the enterprise network. For example, a resource in the emerging 202 life stage may be more likely to experience software bugs that will be fixed at a later stage in the resource's lifetime. Accordingly, some enterprises may prefer to refrain from relying on a large amount resources in the emerging 202 life stage for adoption in enterprise networks. However, some enterprises may prefer to begin adoption of at least some resources in the emerging 202 life stage, in order to reduce the burden of large-scale adoption of the resources when the enter a subsequent life stage.

The lifecycle of the resource may progress to a steady state 204 life stage. A resource in the steady state 204 life stage may be fully supported by a vendor of the resource and may be unlikely to introduce security risks into the enterprise network. Accordingly, resources in the steady state 204 life stage may be suitable for large-scale adoption in the enterprise network.

The lifecycle of the resource may continue with a declining 206 life stage. A resource in the declining 206 life stage may be nearing the end of its lifetime. In some implementations, a resource in the declining 206 life stage may have a replacement resource (e.g., a new version of the resource) available for adoption by the enterprise network. The declining 206 life stage may coincide with a time period of a remaining lifetime for the resource. For example, the remaining lifetime of the resource upon entering the declining 206 life stage may be two years, one year, six months, or some other time period.

The resource may eventually enter a sunsetting 208 life stage. An enterprise may replace resources in the sunsetting life stage. In some cases, the sunsetting 208 life stage may coincide with a time period of a remaining lifetime of the resource. For instance, the remaining lifetime of the resource upon entering the sunsetting 208 life stage may be one year, six months, three months, or some other time period.

Finally, the resource may enter an obsolete 210 stage of the lifecycle. A resource in the obsolete 210 life stage may be at the end of its lifetime. In various implementations, enterprises may seek to replace resources before they enter the obsolete 210 stage. Various implementations of the present disclosure enable replacement of various resources in the enterprise network before the resources enter the obsolete 210 life stage or shortly after the resources enter the obsolete 210 life stage.

Figure 3:
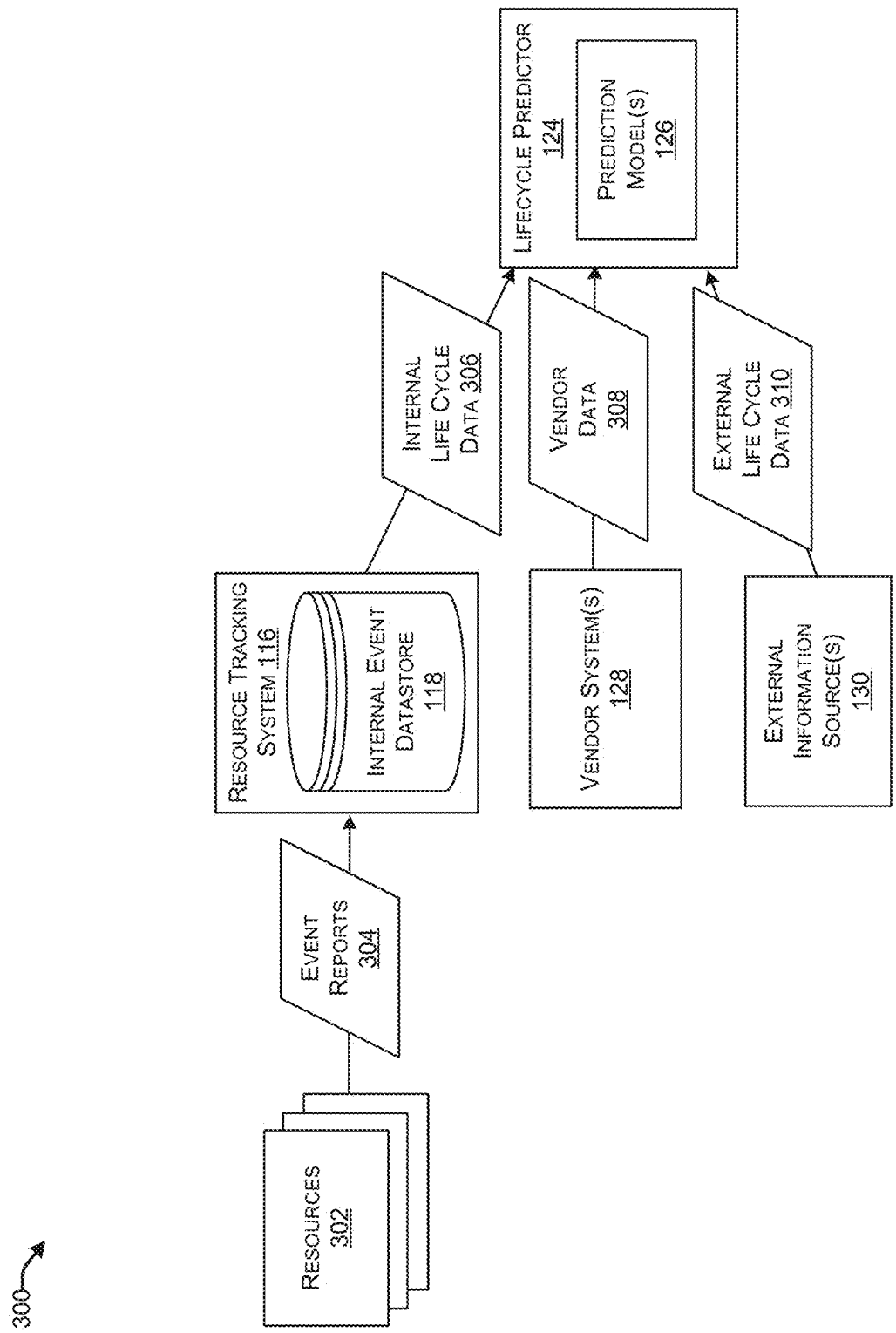
FIG. 3 illustrates an example environment for training models to predict lifecycles of various resources in an enterprise network.

FIG. 3 illustrates an example environment 300 for training models to predict lifecycles of various resources in an enterprise network. As illustrated, the environment 300 includes the resource tracking system 116, the internal event datastore 118, the lifecycle predictor 124, the prediction model(s) 126, the vendor system(s) 128, and the external information source(s) 120 described above with reference to FIG. 1.

The resource tracking system 116 may track various resources 302 in an enterprise network. Examples of the resources 302 include, for instance, any of the hardware resources 106 to 112 and/or software resource 114 described above with reference to FIG. 1. The resources 302 may experience various events (e.g., initialization, user accesses, accesses by other resources, changes in latency beyond a threshold, changes in CPU usage beyond a threshold, crashes, malicious attacks, or the like) during their lifetimes. The resources 302 may transmit, to the resource tracking system 116, event reports 304 indicating the events experienced by the resources 302.

The resource tracking system 116 may store, in the internal event datastore 118, indications of at least some of the events reported in the event reports 304. In various implementations, the resource tracking system 116 may forward indications of the events to the lifecycle predictor 124 as internal life cycle data 306. In some cases, the resource tracking system 116 may further indicate, in the internal life cycle data 306, various details about the resources 302, such as vendor information. The internal life cycle data 306 may indicate lifecycles of the resources 302 as well as various factors that could be relevant to predicting the lifecycles of the resources 302.

In addition to the internal life cycle data 306, the lifecycle predictor 124 may further receive vendor data 308 from the vendor system(s) 128, as well as external life cycle data 310 from the external information source(s) 130. The vendor data 308 may include various vendor-specific information that may be relevant to lifecycle prediction. For instance, the vendor data 308 may include advertisements for replacements to the resources 302 from vendors of the resources 302, vulnerability reports from the vendors, technical specifications, operator or user manuals, or the like. The external life cycle data 310 may include other information that may be relevant to lifecycle prediction. For example, the external life cycle data 310 may include third-party reviews of the resources 302, news articles about the resources 302, vulnerability reports of the resources 302, reports of replacements to the resources 302 that may be available, or the like. The external life cycle data 310 may also include information about resources other than those stored in the internal event datastore 118. Stated differently, the external life cycle data 310 may include information about resources and use(s) of those resources other than in the enterprise network 102.

Collectively, the internal life cycle data 306, the vendor data 308, and the external life cycle data 310 may comprise a training data set. The training data set can be used to train the prediction model(s) 126. The prediction model(s) 126 can identify one or more trigger conditions relevant to lifecycle prediction based on the training data set. In some implementations, the prediction model(s) 126 can identify how any of the trigger conditions are correlated to lifecycle prediction. In some cases, the prediction model(s) 126 may be trained to update predicted lifecycles based on trigger conditions experienced by resources during their lifetimes.

In various implementations, once the prediction model(s) 126 are trained, the prediction model(s) 126 can be used to accurately predict lifecycles of resources that are not part of the resources 302 whose information was used for training. In some cases, the trigger conditions identified by the prediction model(s) 126 can be reported to the resource tracking system 116. The resource tracking system 116 may selectively report, to the lifecycle predictor 124, occurrence of the trigger conditions by resources in the enterprise network and/or may refrain from reporting the occurrence of other events that may be irrelevant to lifecycle prediction.

Figure 4:
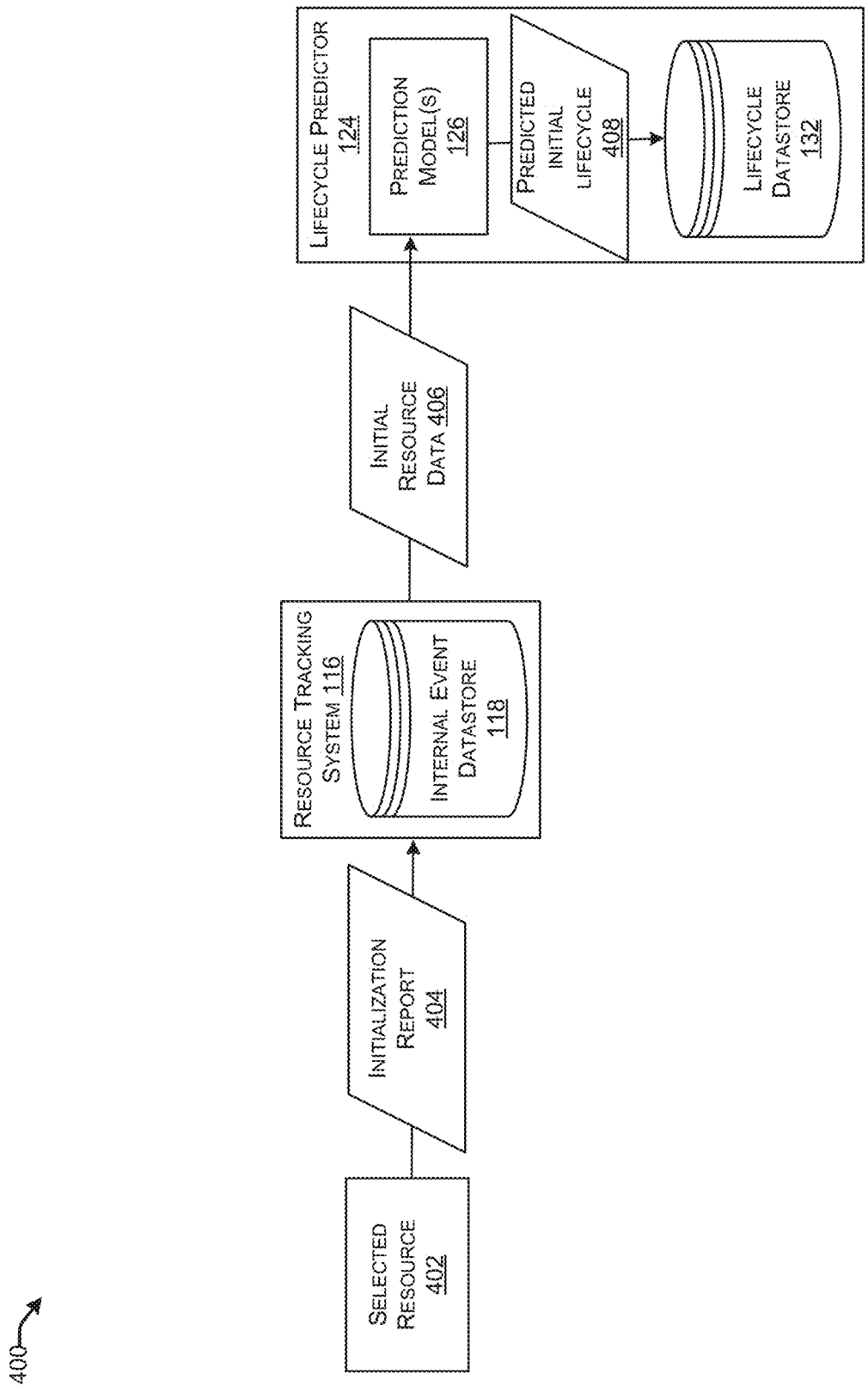
FIG. 4 illustrates an example environment for predicting a lifecycle of a resource upon initialization of that resource.

FIG. 4 illustrates an example environment 400 for predicting a lifecycle of a resource upon initialization of that resource. As illustrated, the environment 400) includes the resource tracking system 116, the internal event datastore 118, the lifecycle predictor 124, the prediction model(s) 126, and the lifecycle datastore 132 described above with reference to FIG. 1. In various implementations, the prediction model(s) 126 may be trained according to the description above with reference to FIG. 3.

In various implementations, a selected resource 402 may connect to an enterprise network (e.g., the enterprise network 102 described above with reference to FIG. 1). Upon connecting to the enterprise network, the selected resource 402 may transmit an initialization report 404 to the resource tracking system 116. The initialization report 404 may indicate an identity of the selected resource 402 (e.g., a unique identification number of the selected resource 402 in the enterprise network) and may indicate that the selected resource 402 has been connected to the enterprise network. In some cases, the initialization report 404 may include further details about the selected resource 402, such as a vendor, a version number, or the like.

In response to receiving the initialization report 404, the resource tracking system 116 may generate an entry in the internal event datastore 118 that corresponds to the selected resource 402. In some implementations, the internal event datastore 118 may include a hash table that is indexed by resource identifier (e.g., a unique identification string, number, or the like associated with the selected resource 402). The entry may further include information provided in the initialization report 404. For example, if the initialization report indicates the vendor of the selected resource 402, the entry may also indicate the vendor of the selected resource 402.

The resource tracking system 116 may report the connection of the selected resource 402 to the enterprise network via initial resource data 406. The initial resource data 406 may indicate that the selected resource 402 has connected to the enterprise network. In some cases, the initial resource data 406 may include additional factors associated with the selected resource 402 that are relevant to lifecycle prediction. For instance, the initial resource data 406 can include information included in the initialization report 404 and/or additional information that the resource tracking system 116 has identified about the selected resource 402 that may not have been included in the initialization report 404.

The lifecycle predictor 124 may use the initial resource data 406 to initially predict a lifecycle of the selected resource 402. The lifecycle predictor 124 may input data in the initial resource data 406 into the prediction model(s) 126. The prediction model(s) 126 may have been previously trained or initialized to predict lifecycles of various resources. The prediction model(s) 126 may output a predicted initial lifecycle 408 by applying one or more rules to the data in the initial resource data 406.

In various cases, the lifecycle predictor 124 may store the predicted initial lifecycle 408 in the lifecycle datastore 132. In some instances, the lifestyle predictor 124 may generate an entry in the lifecycle datastore 132 corresponding to the selected resource 402 and may store the predicted initial lifecycle 408 in the entry. For example, the entry may include the unique identifier of the selected resource 402. The lifecycle datastore 132 may include a hash table including multiple entries corresponding, respectively, to multiple resources in the enterprise network. The hash table may be indexed according to unique identifiers of the multiple resources. Thus, the lifecycle predictor 124 may be able to efficiently retrieve the predicted initial lifecycle 408 using the unique identifier of the selected resource 402.

Figure 5:
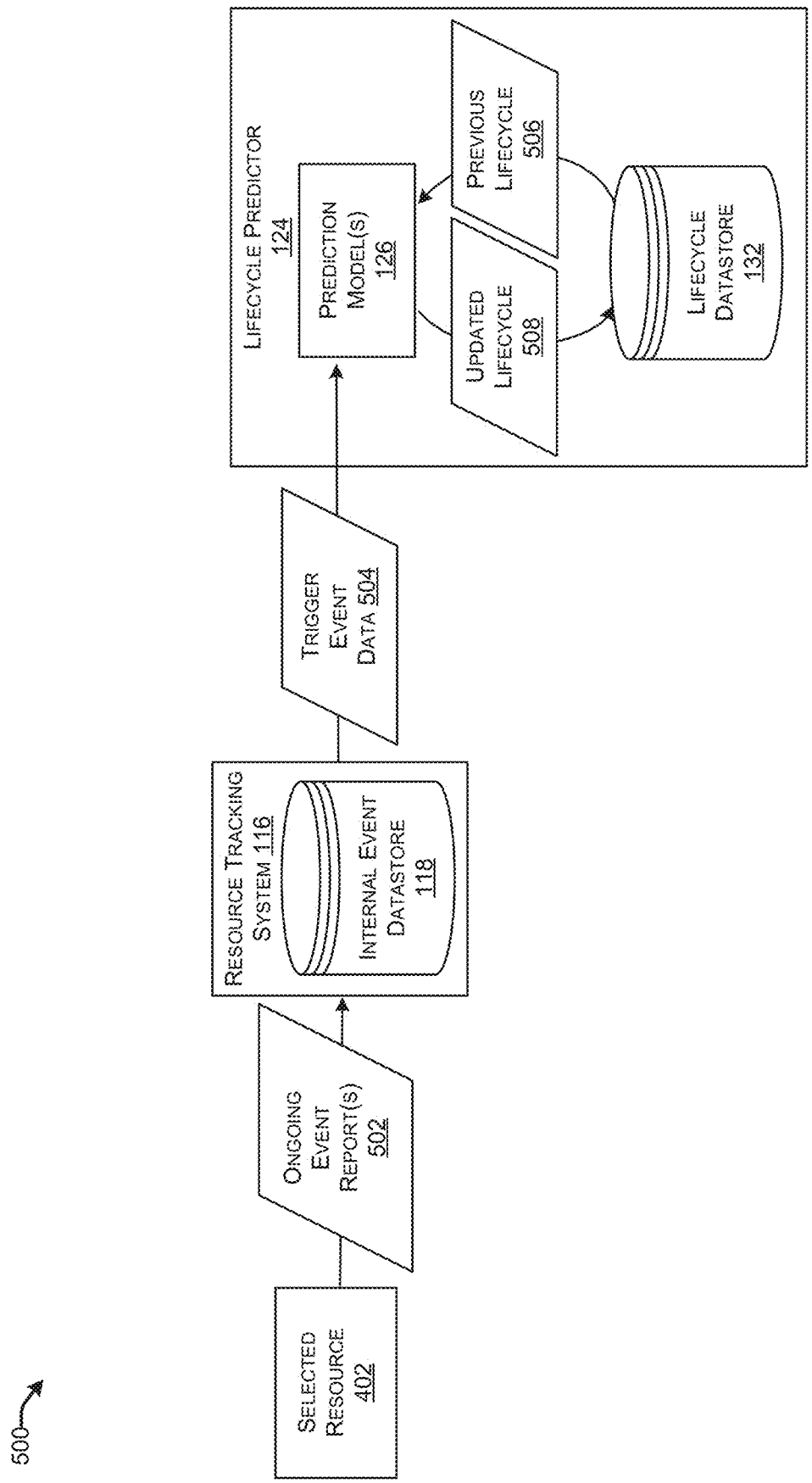
FIG. 5 illustrates an example environment for updating predicted lifecycles according to ongoing events occurring during resource lifetimes.

FIG. 5 illustrates an example environment 500 for updating predicted lifecycles according to ongoing events occurring during resource lifetimes. As illustrated, the environment 500 includes the resource tracking system 116, the internal event datastore 118, the lifecycle predictor 124, the prediction model(s) 126, and the lifecycle datastore 132 described above with reference to FIG. 1. In various implementations, the prediction model(s) 126 may be trained according to the description above with reference to FIG. 3. The environment 500 may further include the selected resource 402 described above with reference to FIG. 1.

During the lifetime of the selected resource 402, the selected resource 402 may experience events that are relevant to lifecycle prediction (e.g., trigger events). The selected resource 402 may transmit, to the resource tracking system 116, at least one ongoing event report 502 indicating one or more of the events experienced by the selected resource 402.

The resource tracking system 116 may receive the ongoing event report(s) 502 from the selected resource 402. The resource tracking system 116 may store at least some information in the ongoing event report(s) 502 in the internal event datastore 118. For instance, the resource racking system 116 may store the information in an entry of the internal event datastore 118 corresponding to the selected resource 402.

The resource tracking system 116 may further report the ongoing events to the lifecycle predictor 124. In various implementations, the resource tracking system 116 may generate trigger event data 504 based, at least partly, on the ongoing event report(s) 502. In some cases, the trigger event data 504 may indicate less information than the information included in the ongoing event report(s) 502. For example, the resource tracking system 116 may have previously received, from the lifecycle predictor 124, an indication of one or more trigger events that are relevant to lifecycle prediction. The resource tracking system 116 may selectively report the occurrence of any of the trigger event(s) indicated in the ongoing event report(s) 502 and may refrain from reporting the occurrence of events that are not any of the trigger event(s). In some implementations, the trigger event data 504 may include more information than the information included in the ongoing event report(s) 502. For instance, the resource tracking system 116 may extract at least some information related to the selected resource 402 from the internal event datastore 118 (e.g., data related to the initialization of the selected resource 402), and may include this information in the trigger event data 504.

The trigger event data 504 may include information relevant to lifecycle prediction. According to various implementations, the prediction model(s) 126 of the lifecycle predictor 124 may be configured to update a predicted lifecycle of the selected resource 402 based on the trigger event data 504. The lifecycle predictor 124 may extract, from the lifecycle datastore 132, a previous lifecycle 506 that has previously been predicted for the selected resource 402. In some cases, the ongoing event report(s) 502 may indicate the unique identifier of the selected resource 402, which the lifecycle predictor 124 may use as a key to extract the previous lifecycle 506 from a bucket in an entry of the lifecycle datastore 132 corresponding to the selected resource 402.

The prediction model(s) 126 may update or otherwise modify the previous lifecycle 506 based on the trigger event data 504 to generate an updated lifecycle 508. For example, the prediction model(s) 126 may apply one or more rules to the trigger event data 504 in order to modify the previous lifecycle 506 into the updated lifecycle 508. The lifecycle predictor 124 may store the updated lifecycle 508 in the lifecycle datastore 132. For example, the previous lifecycle 506 may be replaced with the updated lifecycle 508 in the entry of the lifecycle datastore 132 corresponding to the selected resource 402. Accordingly, the predicted lifecycle of the selected resource 402 may be updated during the lifetime of the selected resource 402 according to events experienced by the selected resource 402.

Figure 6:
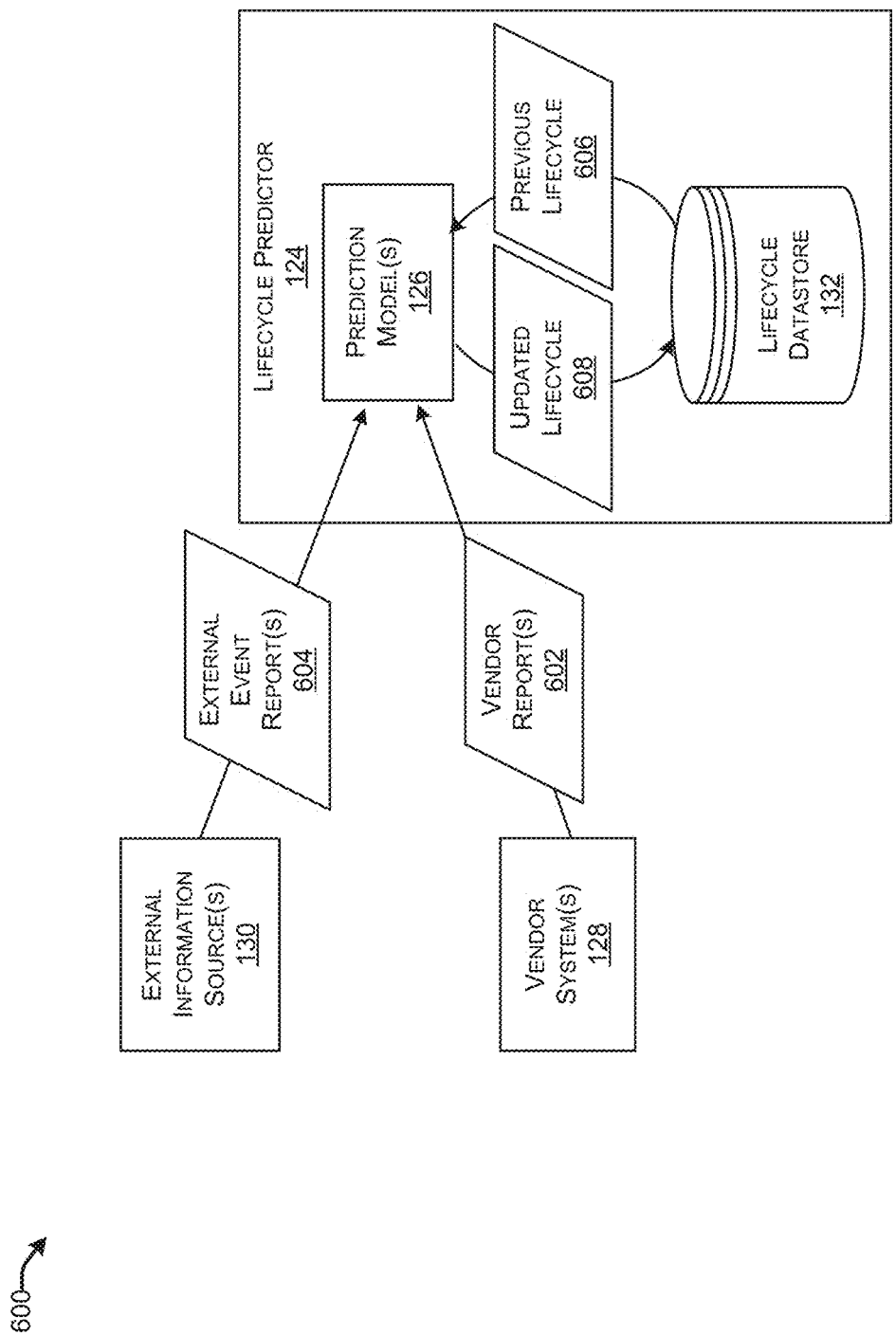
FIG. 6 illustrates an example environment for updating predicted lifecycles of resources in an enterprise network based on information external to the enterprise network.

FIG. 6 illustrates an example environment 600 for updating predicted lifecycles of resources in an enterprise network based on information external to the enterprise network. As illustrated, the environment 600 includes the lifecycle predictor 124, prediction model(s) 126, vendor system(s) 128, external information source(s) 130, and lifecycle datastore 132 described above with reference to at least FIG. 1.

The vendor system(s) 128 may report various information associated with the vendor of a selected resource (e.g., the selected resource 402 described above) in the enterprise network, during the lifetime of the selected resource. The information may be transmitted to the lifecycle predictor 124 in the form of one or more vendor reports 602.

The external information source(s) 130 may report various information associated with external events and/or trends that may be relevant to the lifecycle prediction of the selected resource. This information may be acquired during the lifetime of the selected resource. The information may be transmitted to the lifecycle predictor 124 in the form of one or more external event reports 604.

The vendor report(s) 602 and/or the external event report(s) 604 may include various information relevant to lifecycle prediction. According to various implementations, the prediction model(s) 126 of the lifecycle predictor 124 may be configured to update a predicted lifecycle of the selected resource based on the vendor report(s) 602 and/or the external event report(s) 604. The lifecycle predictor 124 may extract, from the lifecycle datastore 132, a previous lifecycle 606 that has previously been predicted for the selected resource. In some cases, the lifecycle predictor 124 may identify a unique identifier of the selected resource by comparing the vendor report(s) 602 to a list of resources with a particular vendor indicated by the vendor report(s) 602. In some instances, the lifecycle predictor 124 may identify a unique identifier of the selected resource by comparing features of the external event report(s) 604 to a list of resources associated with the features. The lifecycle predictor 124 may use the unique identifier as a key to extract the previous lifecycle 606 from a bucket in an entry of the lifecycle datastore 132 corresponding to the selected resource.

The prediction model(s) 126 may update or otherwise modify the previous lifecycle 606 based on the vendor report(s) 602 and/or the external event report(s) 604 to generate an updated lifecycle 608. For example, the prediction model(s) 126 may apply one or more rules to the vendor report(s) 602 and/or the external event report(s) 604 in order to modify the previous lifecycle 5606 into the updated lifecycle 608. The lifecycle predictor 124 may store the updated lifecycle 608 in the lifecycle datastore 132. For example, the previous lifecycle 606 may be replaced with the updated lifecycle 608 in the entry of the lifecycle datastore 132 corresponding to the selected resource. Accordingly, the predicted lifecycle of the selected resource may be updated during the lifetime of the selected resource according to events and/or information gathered outside of the enterprise network.

Figure 7:
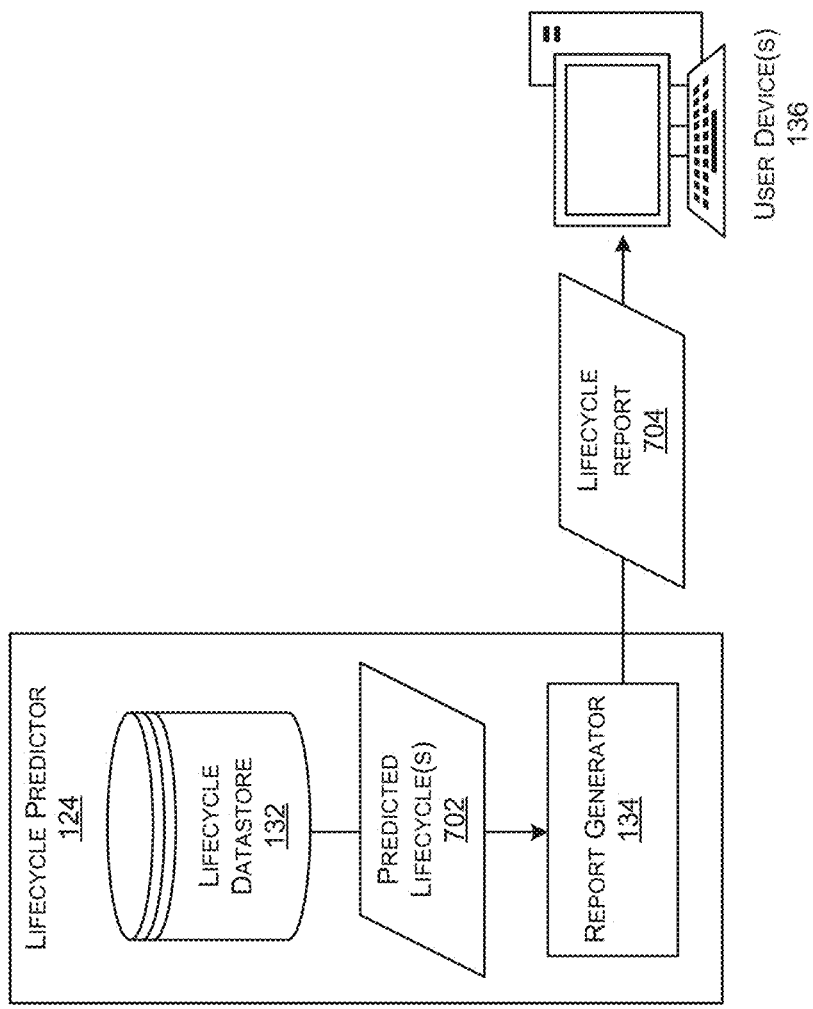
FIG. 7 illustrates an example environment for reporting predicted lifecycles.

FIG. 7 illustrates an example environment 700 for reporting predicted lifecycles. As illustrated, the environment 700 includes the lifecycle predictor 124, the lifecycle datastore 132, the report generator 134, and the user device(s) 136 described above with reference to FIG. 1.

In various implementations, the lifecycle datastore 132 may store one or more entries respectively indicating one or more predicted lifecycles 702 of one or more resources in an enterprise network. The predicted lifecycle(s) 702 can be extracted from the lifecycle datastore 132 by the lifecycle predictor 124 and inputted into the report generator 132. In some cases, the predicted lifecycle(s) 702 may be extracted periodically (e.g., once every day, once every month, or some other frequency), in response to events (e.g., in response to more than a threshold number of resources entering the sunsetting life stage, or in response to some other trigger), or the like.

The report generator 132 may use the predicted lifecycle(s) 702 to generate a lifecycle report 704 that indicates the predicted lifecycle(s) 702. In some cases, the lifecycle report 704 can indicate the lifecycles of multiple resources within the enterprise network. The report may include a graphical report (e.g., an image file, a video file, or the like) that indicates the predicted lifecycle(s) 702. In some cases, the report may include an audio report (e.g., an audio file, or the like) that indicates the predicted lifecycle(s) 702. In various cases, the lifecycle report 704 may emphasize resources and/or predicted lifecycles among the predicted lifecycle(s) 702 that are in greater need of attention than other resources and/or predicted lifecycles among the predicted lifecycle(s) 702. For example, the lifecycle report 704 may emphasize (e.g., by listing them first, highlighted with a particular color that draws attention, or the like) the resources in the obsolete or sunsetting life stages over the resources in the emerging, steady state, or declining life stages. In some cases, the lifecycle report 704 may indicate at least one timeline that lists a recommended replacement schedule of the resources within the enterprise network. The lifecycle report 704, for example, may indicate at least one roadmap, an inventory of the enterprise network, a dashboard, a User Interface (UI), or the like.

The report generator 134 may transmit the lifecycle report 704 to the user device(s) 136. Upon receiving the lifecycle report 704, the user device(s) 136 may output the lifecycle report 704 to one or more users associated with the user device(s) 136. In some cases, the user(s) may include at least one administrator (e.g., an IT specialist) of the enterprise network. Accordingly, the administrator(s) can take various actions (e.g., ordering replacement resources, planning budgets for future replacements of resources, or the like) based on the predicted lifecycle(s) 702.

Figure 8:
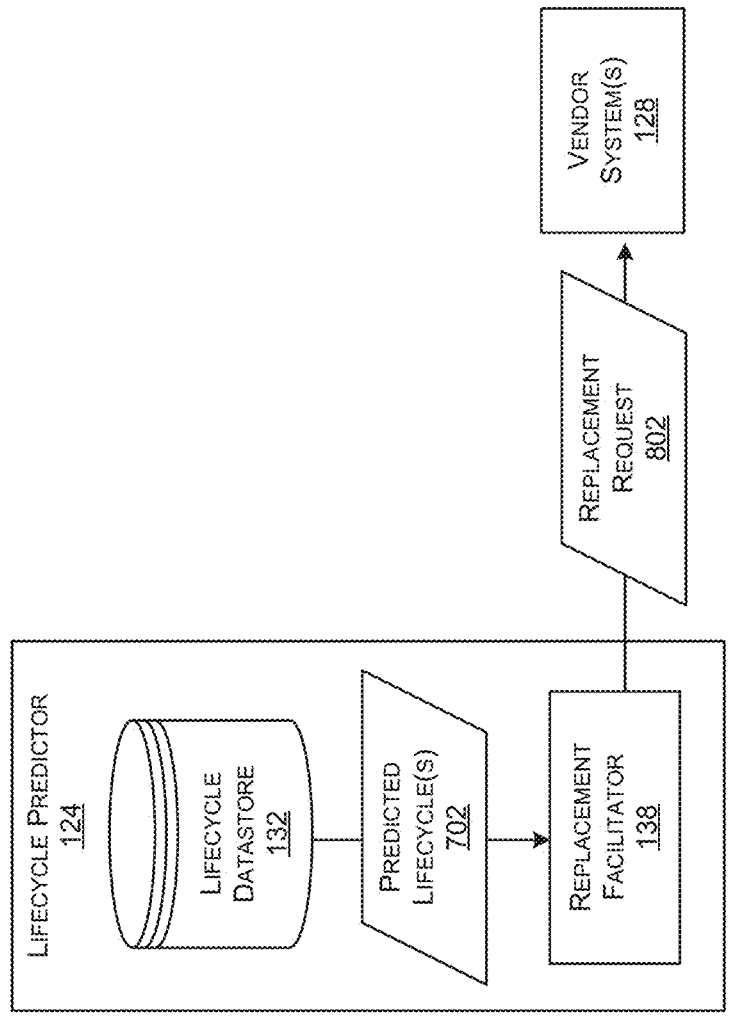
FIG. 8 illustrates an example environment for automatically replacing resources based on predicted lifecycles of the resources.

FIG. 8 illustrates an example environment 800 for automatically replacing resources based on predicted lifecycles of the resources. As illustrated, the environment 800 includes the lifecycle predictor 124, vendor system(s) 128, lifecycle datastore 132, and replacement facilitator 138 described above with reference to FIG. 1. In addition, the environment 800 may utilize the predicted lifecycle(s) 702 described above with reference to FIG. 7.

In various implementations, the lifecycle predictor(s) 124 may extract the predicted lifecycle(s) 702 from the lifecycle datastore 132. The replacement facilitator 138 may evaluate the predicted lifecycle(s) 702 for various resources within the enterprise network that are in need of replacement according to one or more policies. For example, the replacement facilitator 138 may identify one or more resources that are in the sunsetting life stage, within a threshold time period (e.g., one year, six months, or some other time period) of lifetime expiration, or the like, using the predicted lifecycle(s) 702.

The replacement facilitator 138 may automatically perform replacement of the resources that are in need of replacement. For instance, the replacement facilitator 138 may transmit, to the vendor system(s) 128, a replacement request 802. The replacement request 802 may be a request for new resources that can replace the resources in need of replacement. In some cases, the replacement request 802 may include a purchase request, a lease request, or the like, on behalf of the enterprise. In response to receiving the replacement request 802, the vendor system(s) 128 may provide the replacement resources in accordance with the replacement request 802. Accordingly, expiring resources may be automatically replaced using lifecycle prediction.

Figure 9:
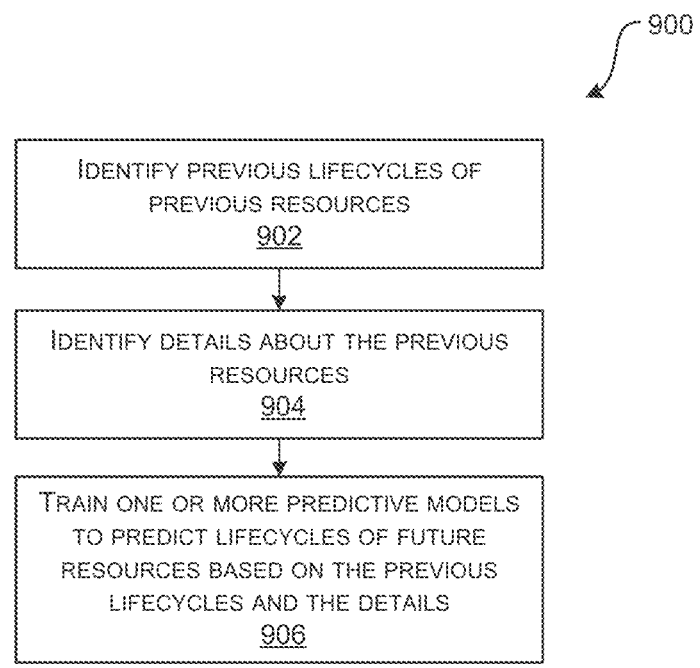
FIG. 9 illustrates an example process for training one or more predictive models to estimate lifecycles of resources.

FIG. 9 illustrates an example process 900 for training one or more predictive models to estimate lifecycles of resources. In various implementations, the process 900 can be performed by an entity including at least one of a resource management system (e.g., the resource management system 122 described above) or a lifecycle predictor (e.g., the lifecycle predictor 124 described above).

At 902, the entity may identify previous lifecycles of previous resources. The previous resources may include various resources within an enterprise network, as well as outside of the enterprise network, whose lifetimes have expired. The lifecycles may include lifespans of the previous resources, lifetimes of the previous resources, life stages of the previous resources, or the like. For instance, the previous lifecycles may identify times and/or durations at which the previous resources were in emerging, steady state, declining, sunsetting, and/or obsolete life stages.

At 904, the entity may identify other details about the previous resources. The details may include a variety of information about the previous resources. At least some of this information may be relevant to lifecycle prediction. For example, the details may include user manuals associated with the previous resources, trends of utilization of the previous resources in the industry (e.g., one or more enterprise networks) over time, an amount of incidents and/or outages of the previous resources over time, an amount of competing types of resources available for purchase over time, active vulnerabilities of the resources, redundancy of capabilities of the previous resources and other resources on the market, relevance of the previous resources to industry needs, ongoing support and/or lack of support for outages by vendors of the previous resources, benefits of the previous resources to the industry, costs of the previous resources to the industry, availability of support personnel that can operate the previous resources, criticality of capabilities of the previous resources to the industry, emerging industry trends, or the like.

At 906, the entity may train one or more predictive models to predict lifecycles of future resources based on the previous lifecycles and the other details. In some implementations, the predictive model(s) may include at least one machine learning model. The machine learning model(s) may include, for example, at least one of a k-nearest neighbors model, a reinforcement learning model, a bootstrap aggregation model, a stochastic gradient descent model, a genetic algorithm, a radial basis function network, a backpropagation model, a minimum redundancy feature selection model, a random cut forest model, a latent direchlet allocation model, a principal component analysis model, a gradient boosting model, or the like. In some cases, the entity may train the predictive model(s) using supervised learning and/or unsupervised learning techniques.

In various examples, as a result of the process 900, the predictive model(s) may be used to predict lifecycles of various resources in an enterprise network.

Figure 10:
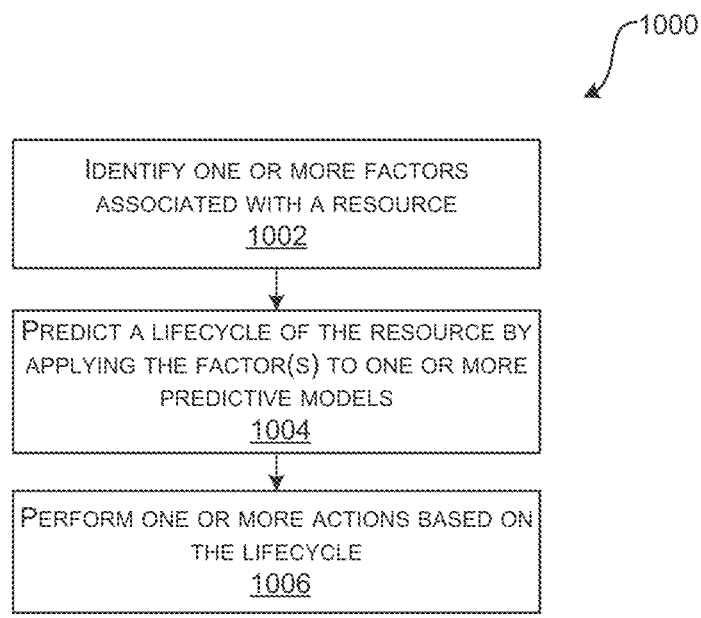
FIG. 10 illustrates an example process for performing and utilizing a predicted lifecycle of a resource.

FIG. 10 illustrates an example process 1000 for performing and utilizing a predicted lifecycle of a resource. In various implementations, the process 900 can be performed by an entity including a resource management system (e.g., the resource management system 122 described above).

At 1002, the entity may identify one or more factors associated with a resource. In some cases, the factor(s) may include one or more trigger events experienced by the resource itself in the enterprise network. In some examples, the factor(s) may include information about a vendor of the resource. According to some implementations, the factor(s) may include external events that are relevant to predicting the lifecycle of the resource.

At 1004, the entity may predict a lifecycle of the resource by applying the factor(s) to one or more predictive models. The predictive model(s) may have been previously trained with a training data set, in some cases. In some implementations, the predictive model(s) may include one or more machine learning models.

In various implementations, the predictive model(s) may initially predict the lifecycle of the resource based on a category of the resource. Examples of various lifetimes that can be predicted for the resource, based on the type of the resource, are described in the following Table 1:

TABLE 1

Sample Initial Predicted Lifetimes

| Type of Resource | Expected Lifetime |
|---|---|
| Server Operating Systems (major) Version | 5 Years (60 months) |
| Workstation Operating Systems (major) Version | 6 Years (72 months) |
| Shared Service/Web Server/Servlet version | 4 years (48 months) |
| Platform/Infrastructure technology (Major version) | 8 years (96 months) |
| Software (major) version-developed by enterprise network | 5 years (60 months) |
| Software (major) version - Procured from outside vendor | 3 years (36 months) |

TABLE 1-continued

Sample Initial Predicted Lifetimes

| Type of Resource | Expected Lifetime |
| --- | --- |
| Open source code/software (major) version | 12 months |

In various cases, the predictive model(s) may predict the lifecycle of the resource using one or more rules. The rule(s) can be applied in response to the occurrence of one or more trigger events. Examples of various rules that can be used to predict the lifecycle of the resource are described in the following Table 2:

TABLE 2

Sample Trigger Events

| Category of Resource | Effect on Life Stage | Trigger Event |
| --- | --- | --- |
| All | Steady State -> Declining | A 50% reduction of consumers or utilization over the last 12 months |
| All | Steady State -> Declining | 75% increase in incidents/outages over the last three months |
| All | Steady State -> Declining | More than two versions of the same resource in production (move oldest version to declining) |
| All | Any Stage -> Sunset | Active vulnerability without available fix |
| All | Steady state -> Declining | Industry use of the resource is declining |
| Software (e.g., version, application, Operating System (OS), etc.) | Steady State -> Declining | Within 24 months of expected end of life |
| Software (e.g., version, application, Operating System (OS), etc.) | Declining -> Sunset | Within 12 months of expected end of life |
| Resource Used in Enterprise Network Platform/Infrastructure | Steady State -> Declining | Within 48 months of expected end of life |
| Resource Used in Enterprise Network Platform/Infrastructure | Declining -> Sunset | Within 24 months of expected end of life |
| All | Any Stage -> Sunset | A new resource is moved to steady state with redundant capabilities to the original resource |
| All | Any Stage -> Sunset | Capability which this resource enables is no longer needed in enterprise network |
| All | Any Stage - Declining | The technology has not received any updates in the last 9 months |
| Resource not Used in Enterprise Network Platform/Infrastructure | Emerging or Invest Steady State | The technology has seen a leveling off of incidents/outages/unplanned fixes over a period of at least 3 months and planned initial rollouts have been completed |
| Resource Used in Enterprise Network Platform/Infrastructure | Emerging or Invest -> Steady State | The technology has seen a leveling off of incidents/outages/unplanned fixes over a period of at least 6 months and all planned capabilities have been delivered |

In various implementations, the predictive model(s) may derive the significance of various other triggers to lifecycle prediction. For instance, Table 3 lists a number of other triggers (e.g., events and/or factors) that may affect lifecycle prediction:

TABLE 3

Other Triggers Associated with Lifecycle Prediction

| Triggers | Description |
| --- | --- |
| Support cost vs Benefits | Yearly support cost vs benefit provided |
| Skilled resource availability | Resources available at the enterprise network, in the industry, or coming out of college to support a given technology |
| Coding language used | Industry trends in use of coding language plus resources available at the enterprise network, in the industry, or coming out of college with knowledge to support/code |
| Criticality of capability | Technologies which enable critical capabilities should likely have shorter lifespans to ensure availability and not have a negative impact on customer experience |
| Emerging industry trends | Emerging trends in the industry may indicate or influence the lifespan of technologies that the enterprise network currently possesses |

In some cases, the entity may update a previous lifecycle estimated for the resource. For example, the entity may initially estimate a lifecycle of the resource, and may update the initially estimated lifecycle in response to various events occurring during the lifetime of the resource. At least some of these events may be trigger events that are selectively reported from the enterprise network.

At 1006, the entity may perform one or more actions based on the predicted lifecycle. In some cases, the entity may generate a report summarizing the predicted lifecycle, and optionally, other lifecycles of other resources in the enterprise network. The report may be output to a user, such as an administrator, of the enterprise network who can plan for replacement of the resources based on the reported lifecycles. In some implementations, the entity may automatically enable replacement of resources that are approaching the ends of their lifecycles (e.g., resources that are in a sunsetting or obsolete life stage, resources that are within a threshold time period of the ends of their lifetimes, or the like). For example, the entity may automatically replace one or more resources in the enterprise network.

Figure 11:
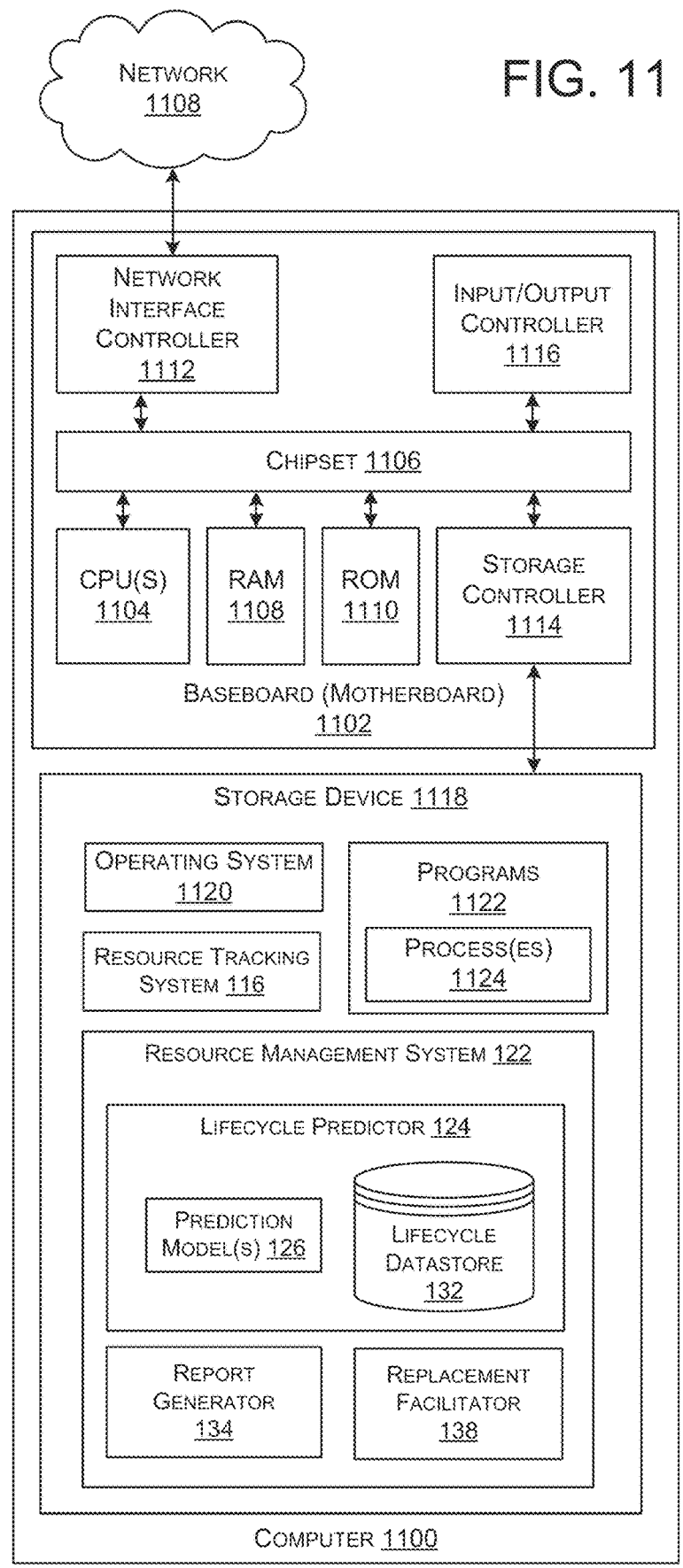
FIG. 11 illustrates an example system for performing various functionality described herein.

FIG. 11 shows an example computer architecture for a device 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein.

The computer 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a Random Access Memory (RAM) 1108, used as the main memory in the computer 1100. The chipset 1106 can further provide an interface to a computer-readable storage medium such as a read-only memory (ROM) 1110 or non-volatile RAM (NVRAM) for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1108. The chipset 1106 can include functionality for providing network connectivity through a Network Interface Controller (NIC) 1112, such as a gigabit Ethernet adapter. The NIC 1112 is capable of connecting the computer 1100 to other computing devices over the network 1108. It should be appreciated that multiple NICs 1112 can be present in the computer 1100, connecting the computer to other types of networks and remote computer systems. In some instances, the NICs 1112 may include at least on ingress port and/or at least one egress port.

The computer 1100 can also include one or more input/output controllers 616 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device.

The computer 1100 can be connected to a storage device 1118 that provides non-volatile storage for the computer. The storage device 1118 can store an operating system 1120, programs 1122, and data, which have been described in greater detail herein. The storage device 1118 can be connected to the computer 1100 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computer 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In various implementations, the components and/or functionality of the computer 1100 can be distributed across multiple physical devices, such as a cloud-computing system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Washington.

According to further embodiments, the operating system can comprise the UNIX operating system or one of its variants. It should be appreciated that other operating systems can also be utilized. The storage device 1118 can store other system or application programs and data utilized by the computer 1100.

In one embodiment, the storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 1-10. The computer 1100 can also include computer-readable storage media having instructions stored thereupon for performing any of the other computer-implemented operations described herein.

As illustrated in FIG. 11, the storage device 1118 stores the resource tracking system 116, the resource management system 122, the lifecycle predictor 124, the prediction model(s) 126, the lifecycle datastore 132, the report generator 134, and the replacement facilitator 138 described above. In some implementations, at least one of the resource tracking system 116, the resource management system 122, the lifecycle predictor 124, the prediction model(s) 126, the lifecycle datastore 132, the report generator 134, or the replacement facilitator 138 can be omitted. Using instructions stored in the resource tracking system 116, the resource management system 122, the lifecycle predictor 124, the prediction model(s) 126, the lifecycle datastore 132, the report generator 134, and the replacement facilitator 138, the computer (e.g., via the CPU(s) 1104) can perform various functionality described herein.

It will be appreciated that the computer 1100 might not include all of the components shown in FIG. 11, can include other components that are not explicitly shown in FIG. 11, or might utilize an architecture completely different than that shown in FIG. 11.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not.

What is claimed is:

1. A method, comprising:
generating a trained machine-learned prediction model by training a machine-learned prediction model using a training data set and a machine-learning algorithm, wherein training the machine-learned prediction model includes configuring the machine-learned prediction model, using the machine-learning algorithm, to identify relationships between resource lifecycles, resource vendors, and resource technological types;
identifying that a resource is connected to an enterprise network, the resource comprising at least one of hardware or software, being associated with a vendor, and being among a class of a plurality of classes, wherein: individual classes in the plurality of classes are assigned by the trained machine-learned prediction model to a respective distinct technology type of a plurality of technology types; and multiple resources sharing a technological type of the plurality of technology types are assigned to the class;
executing the trained machine-learned prediction model, using documentation associated with the vendor and the technological type as a first input, to generate an initial lifecycle of the resource as a first output, the initial lifecycle including an initial expected replacement time, wherein executing the trained machine-learned prediction model comprises:
the trained machine-learned prediction model performing natural language processing of the documentation to determine the vendor as model input, and
the trained machine-learned prediction model determining:
a mathematical significance associated with the vendor and the technological type, and
the initial lifecycle including the initial expected replacement time based on the mathematical significance;
storing the initial lifecycle in a database together with an identification of the resource;
receiving, from a resource tracking system, a data packet comprising an indication of at least one of a change in latency associated with the resource or a change in processor utilization associated with the resource;
determining that a trigger event associated with the resource has occurred based at least in part on the data packet;
executing the trained machine-learned prediction model, using the trigger event and the class as a second input, to:
generate a plurality of rules associated with the class, and
generate, based at least in part on the trigger event and at least one rule of the plurality of rules associated with the trigger event, an updated lifecycle of the resource, the updated lifecycle including an updated expected replacement time as a second output;
generating, based at least in part on the second output, a report indicating the updated lifecycle of the resource;
transmitting the report to a user device;
automatically replacing the resource in advance of the updated expected replacement time based at least in part on the report; updating the training data set with training data associating the vendor, the technological type, and the updated lifecycle of the resource; and
retraining the machine-learned prediction model using the updated training data set and the machine-learning algorithm.

2. The method of claim 1, wherein the trigger event comprises one or more of:
a reduction of utilization of the resource within the enterprise network over a first time interval,
an increase of outages of the resource within the enterprise network over a second time interval,
an availability of at least one updated resource corresponding to the resource,
a decline in utilization of the resource or related resources over a third time interval, or
an absence of updates to the class released within a fifth time interval.

3. The method of claim 1, wherein the machine-learning algorithm comprises one or more of:
a backpropagation model,
a gradient descent model, or
a gradient boosting model.

4. The method of claim 1, further comprising executing the retrained machine-learned prediction model using a second trigger event and a second class as a third input, to generate a second plurality of rules associated with the second class and a second updated lifecycle of the second resource.

5. A method, comprising:
training a machine-learned prediction model using a training data set and a machine-learning algorithm, wherein training the machine-learned prediction model includes configuring the machine-learned prediction model, using the machine-learning algorithm, to identify relationships between characteristics of resources and resource lifecycles to generate a trained machine-learned prediction model;
identifying that a resource is operational within an enterprise network, wherein the resource is among a class of a plurality of classes, wherein:
  individual classes in the plurality of classes are assigned to a respective distinct technology type of a plurality of technology types; and
  multiple resources sharing a technological type of the plurality of technology types are assigned to the class;
executing the trained machine-learned prediction model, using documentation associated with one or more characteristics of the resource as a first input, to generate an initial lifecycle of the resource as a first output, wherein executing the trained machine-learned prediction model comprises:
  the trained machine-learned prediction model performing natural language processing of the documentation to determine a first characteristic of the resource as model input, and
  the trained machine-learned prediction model determining:
    a mathematical significance associated with the first characteristic and the technological type, and
    the initial lifecycle including an initial expected replacement time based on the mathematical significance;
receiving, from a resource tracking system, a data packet comprising an indication of at least one of a change in latency associated with the resource or a change in processor utilization associated with the resource;
identifying that a trigger condition associated with the resource has occurred based at least in part on the data packet;
executing the trained machine-learned prediction model, using the trigger condition and the class as a second input, to:
  generate a plurality of rules associated with the class, and
  generate, based at least in part on the trigger condition, the initial lifecycle, and at least one rule of the plurality of rules associated with the trigger condition, an updated lifecycle of the resource as a second output;
determining a replacement time of the resource based at least in part on the second output;
causing automatic replacement of the resource in advance of the replacement time based at least in part on the replacement time;
updating the training data set with training data associating the one or more characteristics of the resource and the updated lifecycle of the resource; and
retraining the machine-learned prediction model using the updated training data set and the machine-learning algorithm.

6. The method of claim 5, wherein the machine-learning algorithm comprises one or more of:
a backpropagation model,
a gradient descent model, or
a gradient boosting model.

7. The method of claim 5, wherein the trigger condition comprises at least one of an internal event experienced by the resource in the enterprise network, at least one external event related to the resource that occurred outside of the enterprise network, or at least one vendor event that has occurred to a vendor of the resource.

8. The method of claim 5, wherein the trigger condition comprises one or more of:
a first threshold reduction of utilization of the resource within the enterprise network over a first time interval,
a second threshold increase of outages of the resource within the enterprise network over a second time interval,
an availability of an alternative resource corresponding to the resource,
a threshold decline in utilization of the resource or a related resource over a third time interval, or
an absence of updates to the class released within a fifth time interval.

9. The method of claim 5, wherein the training data set indicates multiple events experienced by previous resources and previous lifecycles of the previous resources and
wherein executing the trained machine-learned prediction model to generate the updated lifecycle comprises executing the trained machine-learned prediction model, using the trigger condition and the class as the second input, to generate the updated lifecycle as the second output.

10. The method of claim 5, wherein the training data set indicates previous resources that experienced the trigger condition and previous lifecycles of the previous resources, and
wherein executing the trained machine-learned prediction model to generate the updated lifecycle comprises executing the trained machine-learned prediction model, using the at least one of the change in latency associated with the resource or the change in processor utilization associated with the resource and the class as a third input, to generate the trigger condition as a third output.

11. The method of claim 5, further comprising transmitting, to at least one user device associated with the enterprise network, a report indicating that the resource should be replaced in advance of the replacement time.

12. The method of claim 5, wherein:
the method further comprises determining a threshold time period of the replacement time based at least in part on the class; and
causing replacement of the resource comprises automatically ordering a replacement resource within the threshold time period of the replacement time.

13. A system, comprising:
at least one processor; and
memory storing instructions that, when executed by the at least one processor, cause the at least one processor to perform operations comprising:
  training a machine-learned prediction model using a training data set and a machine-learning algorithm, wherein training the machine-learned prediction model comprises configuring the machine-learned prediction model, using the machine-learning algorithm, to identify relationships between characteristics of resources and resource lifecycles to generate a trained machine-learned prediction model;

identifying that a resource has connected to an enterprise network, wherein the resource is among a class of a plurality of classes, wherein:

individual classes in the plurality of classes are assigned to a respective distinct technology type of a plurality of technology types; and multiple resources sharing a technological type of the plurality of technology types are assigned to the class;

executing the trained machine-learned prediction model, using documentation associated with one or more characteristics of the resource as a first input, to generate an initial lifecycle of the resource as a first output, the initial lifecycle including an initial expected replacement time, wherein executing the trained machine-learned prediction model comprises:

the trained machine-learned prediction model performing natural language processing of the documentation to determine a first characteristic of the resource as model input, and the trained machine-learned prediction model determining:

a mathematical significance associated with the first characteristic and the technological type, and the initial lifecycle including the initial expected replacement time based on the mathematical significance;

receiving, from a resource tracking system configured to monitor the resource, a data packet comprising an indication of at least one of a change in latency associated with the resource or a change in processor utilization associated with the resource;

determining that the resource has experienced a trigger event based at least in part on the data packet;

executing the trained machine-learned prediction model, using the trigger event and the class as a second input, to:

generate a plurality of rules associated with the class, and generate, based at least in part on the trigger event and at least one rule of the plurality of rules associated with the trigger event, an updated expected replacement time of the resource as a second output;

generating, based at least in part on the second output, a report indicating the updated expected replacement time of the resource;

transmitting the report to a user device to initiate an automatic replacement of the resource;

updating the training data set with training data associating the one or more characteristics of the resource and the updated lifecycle of the resource; and retraining the machine-learned prediction model using the updated training data set and the machine-learning algorithm.

14. The system of claim 13, wherein the plurality of classes comprises at least one of a first class associated with a data storage hardware technology type and a second class associated with a software application technology type.

15. The system of claim 13, wherein the trigger event comprises one or more of:

a first threshold reduction of utilization of the resource within the enterprise network over a first time interval, a second threshold increase of outages of the resource within the enterprise network over a second time interval, an availability of an alternative resource corresponding to the resource, a third threshold decline in utilization of the resource or a related resource over a third time interval, or an absence of updates to the class released within a fifth time interval.

16. The system of claim 13, wherein the trigger event comprises at least one of an internal event experienced by the resource in the enterprise network, an external event related to the resource that occurred outside of the enterprise network, or a vendor event that has occurred to a vendor of the resource.

17. The system of claim 13, wherein the training data set indicates multiple events experienced by previous resources and previous lifecycles of the previous resources, and wherein executing the trained machine-learned prediction model to generate the updated expected replacement time comprises executing the trained machine-learned prediction model using the trigger event and the class as a third input to generate an updated lifecycle as a third output.

18. The system of claim 13, wherein the training data set indicates previous resources that experienced the trigger event and previous lifecycles of the previous resources, and wherein executing the trained machine-learned prediction model to generate the updated expected replacement time comprises executing the trained machine-learned prediction model using the at least one of the change in latency associated with the resource or the change in processor utilization associated with the resource and the class as a third input to generate the trigger event as a third output.

19. The system of claim 13, wherein the updated expected replacement time is associated with a lifetime of the resource and the operations further comprise:

determining, based at least in part on a rule of the plurality of rules, a threshold time period;

identifying, based at least in part on the updated expected replacement time, that the lifetime of the resource is within the threshold time period of expiring; and in response to identifying that the lifetime of the resource is within the threshold time period of expiring, causing replacement of the resource in the enterprise network.

20. The system of claim 19, wherein causing replacement of the resource comprises automatically ordering a replacement resource within the threshold time period.

* * * * *